United States Patent

[11] 3,575,375

[72] Inventor  Ervin H. Strem, Jr.
              Mount Clemens, Mich.
[21] Appl. No. 855,929
[22] Filed     Sept. 8, 1969
[45] Patented  Apr. 20, 1971
[73] Assignee  General Motors Corporation
               Detroit, Mich.

[54] REAR VIEW MIRROR ASSEMBLY
     4 Claims, 4 Drawing Figs.
[52] U.S. Cl. .................................................. 248/481,
                                          248/288, 287/21
[51] Int. Cl. ...................................................... B60r 1/04
[50] Field of Search............................................. 248/475A,
         475, 288, 481, 484; 350/288; 287/12, 21, 87, 90A

[56]              References Cited
              UNITED STATES PATENTS
1,775,712   9/1930   Alvord ........................... 287/87X 3,003,399   10/1961   Donner ......................... 287/87X
3,425,657   2/1969    Doyle ........................... 248/481
              FOREIGN PATENTS
1,096,178  12/1967   Great Britain................ 248/475

Primary Examiner—Roy D. Frazier
Assistant Examiner—Frank Domotor
Attorneys—J. L. Carpenter and E. J. Biskup ABSTRACT: A breakaway rear view mirror assembly wherein a support arm having a mirror adjustably mounted at a lower end has a spherical ball formed at the other end which includes a transverse V-shaped notch. The ball is normally frictionally held between a clamping plate and a mounting bracket attached interior the vehicle adjacent the windshield. After a predetermined rotation of the support arm, the clamping plate loses contact with the ball in the vicinity of the notch whereby the mirror separates from the mounting bracket.

INVENTOR.
Ervin H. Strem, Jr.
BY
E. J. Bishop
ATTORNEY

REAR VIEW MIRROR ASSEMBLY

Recently, legislation has been enacted requiring interior rearview mirror assemblies to conform to certain standards insofar as mounting is concerned. Briefly, the mirror is required to break away, deflect, or collapse when subjected to an impact within a predetermined zone. In accomplishing a mounting of this type many arrangements have been utilized, the primary arrangement being a construction wherein the mirror is universally connected to the vehicle at a pair of collapsible ball and socket joints. Other constructions have incorporated frangible support sections such as shown and disclosed in De Claire et al. U.S. Pat. No. 3,436,049, assigned to the assignee of the present invention, wherein the mirror support arm breaks away from the mounting portion of the assembly under predetermined loading conditions. An example of a deflectable or collapsible mirror assembly is shown in Doyle, U.S. Pat. No. 3,425,657, assigned to the assignee of the present invention, wherein an upper spherical end of the mirror support arm is received within a socket portion of the mounting bracket and includes frangible interlock means which normally prevent movement of the mirror and support arm. The interlock means are frangible upon application of a predetermined force to the mirror, thereby permitting universal movement of the latter relative to the mounting bracket.

The present invention contemplates a unique mirror construction which incorporates the features of both the breakaway and the deflecting mounting arrangements by providing a mirror which physically separates from the mounting structure after predetermined rotation or deflection. More specifically, a support arm has a mirror connected at the lower end and a spherical ball formed at the upper end which is normally frictionally held by a clamping plate against a socket formed in a mounting bracket. A transverse V-shaped notch is formed in the ball intermediate the mounting bracket and the clamp plate. After predetermined rotation or universal movement of the ball relative to the socket, the clamping plate loses contact with the ball in the vicinity of the notch and permits the mirror to physically separate from the mounting structure. With this arrangement, two distinct movements are sequentially effected upon impact of the mirror. First, the mirror and the support arm rotate about the aforementioned universal connection. Second, the mirror and the support arm separate from the mounting structure.

Accordingly, it is an object of the present invention to provide a motor vehicle rearview mirror assembly wherein a mirror is releasably connected to the vehicle and separable therefrom after predetermined movement.

Another object of the present invention is to provide an interior rearview mirror assembly for a motor vehicle wherein a support arm including a mirror is supported on a mounting member at a releasable universal connection such that the mirror and support arm are separable from the universal connection after predetermined movement of the mirror.

Yet another object of the present invention is to provide an interior rearview mirror assembly wherein a mirror support arm having a mirror adjustably connected to a lower end includes a spherical upper end that is normally fixedly held against a mounting socket by a clamping member, the spherical end having a notch formed therein which causes the former to lose contact with the clamping member after predetermined rotation of the support arm, thereby permitting the mirror to physically separate from the mounting socket.

Still another feature of the present invention is to provide an interior rearview mirror assembly wherein a support arm has a mirror connected at one end and a spherical ball at the other end which includes a transverse V-shaped notch, the ball being normally fixedly held against a mounting bracket by a clamping plate which is hingedly connected thereto such that upon movement of the support arm, the ball universally rotates with respect to the mounting bracket and, after the clamping plate loses contact with the ball at the notch, the mirror physically separates from the mounting bracket.

These and other objectives of the present invention will become readily apparent to one skilled in the art upon reading the following detailed description reference being made to the accompanying drawing illustrating a preferred embodiment in which.

Figure 1:
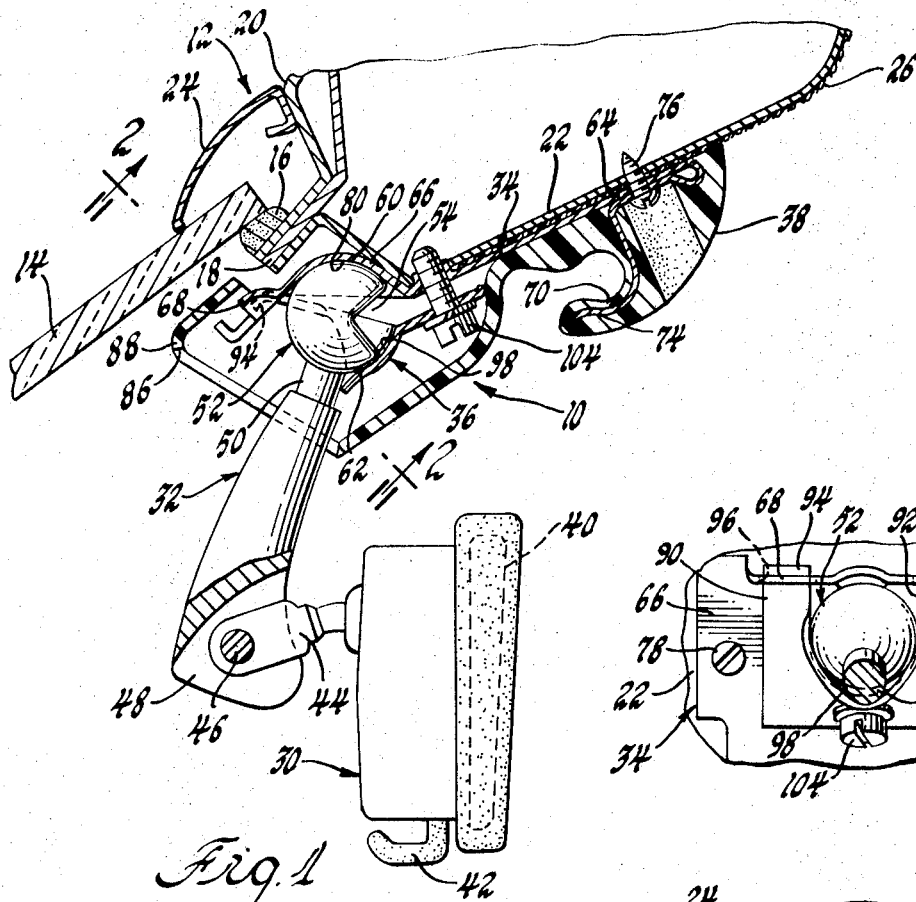
FIG. 1 is a fragmentary-sectional view of a motor vehicle incorporating a rearview mirror assembly made in accordance with the present invention.

Referring to the drawing, a rearview mirror assembly 10 made in accordance with the present invention is mounted interior of a motor vehicle 12 adjacent the upper portion of a windshield 14. The windshield 14 is cemented at 16 to a pinchweld 18 which interconnects a roof panel 20 and a windshield header 22. A decorative molding 24 extends transversely between the windshield 14 and the roof panel 20 externally of the vehicle passenger compartment. A headlining 26 covers the interior surface of the header 22.

The rearview mirror assembly 10 generally comprises a mirror 30, a support arm 32, and a mounting structure including a mounting bracket 34 and a clamping bracket 36. The upper end of the support arm 32 and the mounting structure are covered by a resilient elastomeric cover member 38.

Figure 4:
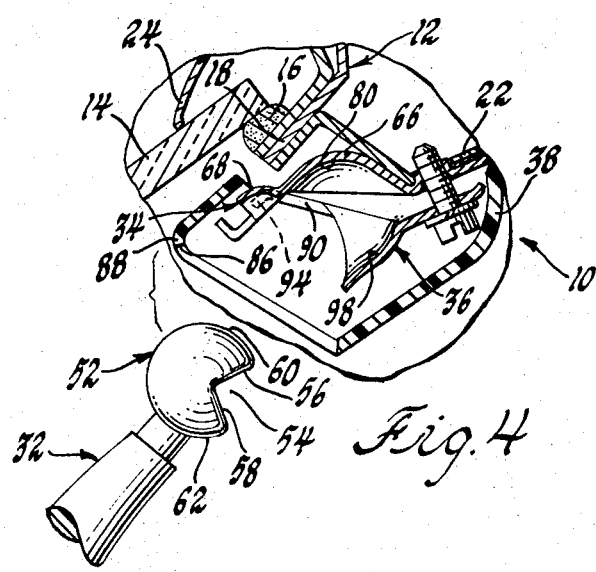
FIG. 4 is a view similar to FIG. 1 showing the rearview mirror assembly after separation of the support arm from the mounting bracket.

The mirror 30 includes prismoidal mirror element 40 which is shifted between a "day" and a "night" viewing position by night"suitable interior mechanism actuated by a knob 42. The details of construction and operation of the mirror form no part of the present invention and reference may be made to Clayton, U.S. Pat. No. 3,253,510, assigned to the assignee of the present invention, for details thereof. The mirror 30 includes a rearwardly extending stud 44 which is connected by a screw 46 to a lower bifurcated portion 48 of the support arm 32. The upper end of the support arm 32 includes a neck 50 of reduced diameter which terminates in a spherical ball 52. Referring to FIG. 4, a transverse V-shaped notch 54 defined by radial surfaces 56 and 58 is formed in the ball 52. The radial surfaces 56 and 58 define on opposite sides of the notch 54 a seating surface 60 and a clamping surface 62. In the preferred embodiment, the notch 54 has an included angle of substantially 100°, and the periphery thereof has a pronounced curvature for facilitating separation of the support arm 32 from the mounting bracket 34 within a predetermined angle of frontal impact, preferably 30° left and right of center.

Figure 2:
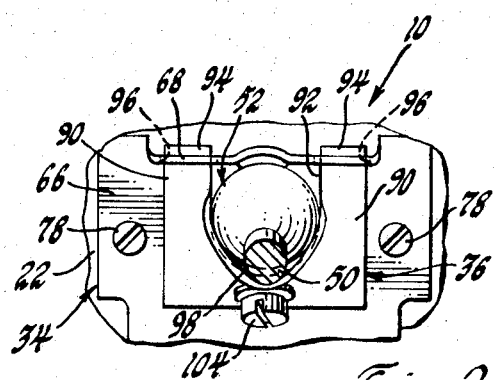
FIG. 2 is a view taken along line 2—2 of FIG. 1.

The mounting bracket 34 includes an upper end 64, an upwardly bent intermediate section 66, and a downwardly extending base 68. The upper end of the cover member 38 includes a curved lip 70 defining a slot for receiving and retaining the inward ends of the vehicle sunshades (not shown). An embedded spring clip 74 serves to resiliently bias the lip 70. The upper end 64 of the mounting bracket 34, the cover member 38, and the spring clip 74 are fixedly secured to the header 22 by a screw 76. As shown in FIG. 2, the extremities of the intermediate section 66 of the mounting bracket 34 are fixedly connected to the header 22 by fasteners 78. A spherical socket 80 is centrally formed in the intermediate section 66 and the adjacent portion of the base 68. In assembly, the upper end of the support arm 32 projects through a generally rectangular opening 86 formed in a lower section 88 of the cover member 38 with the seating surface 60 of the ball 52 engaging the socket 80.

The clamping plate 36 includes a pair of spaced legs 90 which define the generally U-shaped opening 92 having a width slightly greater than the diameter of the ball 52. The legs 90 include inversely bent arms 94 which project through slots 96 formed in the base 68 thereby establishing a hinge connection between the clamping plate 36 and the mounting bracket 34.

A spherical seat 98 is formed intermediate the legs 90 adjacent the opening 92. The seat 98 normally frictionally engages the clamping surface 62 of the ball 52 over an arc of substantially 30°. A screw 104 is adjustably connected between the mounting bracket 34 and the mounting plate 36 and serves to clamp the ball 52 between the socket 80 and the seat 98.

Figure 3:
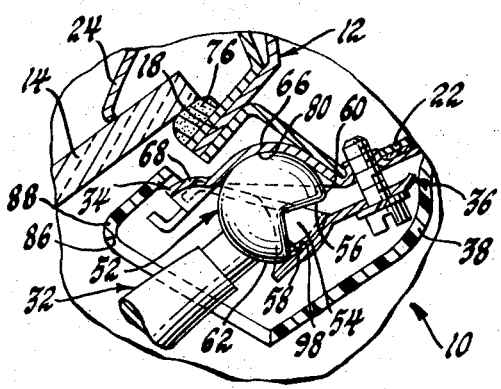
FIG. 3 is a view similar to FIG. 1 showing the rearview mirror assembly after predetermined rotation of the support arm.

Under normal operating conditions, the support arm 32 is fixedly retained relative to the mounting bracket 34 as shown in FIG. 1. In the event the mirror 30 is forwardly impacted, the support arm 32 and the ball 52 will rotate the aforementioned 30° about the universal connection at the socket 80 to the position shown in FIG. 3. At this point, the seat 98 loses contact with the clamping surface 62 in the vicinity of the notch 54; and, inasmuch as no clamping force is applied to the ball, further movement of the support arm 32 causes the ball 52 and the associated mirror 30 to physically separate from the mounting bracket 34 and clamping bracket 36. Because of the curved periphery of the notch, this separation will also occur for an impact 30° right or left of center.

Although only one form of this invention has been shown and described, other forms will be readily apparent to those skilled in the art. Therefore, it is not intended to limit the scope of this invention by the embodiment selected for the purpose of this disclosure but only by the claims which follow.

I claim:

1. An interior rearview mirror assembly for a motor vehicle comprising: a support member having a mirror element connected at one end and a ball member formed at the other end; a mounting member adapted to be attached interior of the motor vehicle having a socket portion in which said ball member is received and about which the latter is relatively movable; clamping means movably connected to the mounting member normally engaging said ball member for retaining the latter against said socket portion; surface means formed in said ball member acting in association with said socket portion in response to a predetermined movement of the support member to cause said clamping means to be released to thereby permit separation of the support member from the mounting member.

2. An interior rearview mirror assembly for a motor vehicle comprising: a support arm; a mirror unit connected to one end of the support arm; a ball formed at the other end of said support arm; a notch formed in said ball and establishing on opposite sides thereof a seating surface and a clamping surface; a mounting member adapted to be attached interior of the motor vehicle; a socket portion formed in said mounting member adapted to receive and universally support said seating surface; a clamping member adjustably connected to the mounting member having a portion normally engaging said clamping surface to frictionally hold said seating surface against said socket portion, said notch and said clamping member cooperating to release said ball from said mounting member after predetermined movement of the support arm, thereby permitting separation of the mirror unit from the mounting member.

3. A breakaway interior rearview mirror assembly for a motor vehicle comprising: a mounting bracket adapted to be attached interior of said motor vehicle; a spherical socket formed in said mounting bracket; a clamping plate having spaced legs hingedly connected to the mounting bracket that define a ball stud receiving opening; a spherical seat formed in said clamping plate between said legs adjacent said opening; adjusting means between the mounting bracket and the clamping plate for relatively pivoting the seat with respect to the socket; an elongated support arm; a spherical ball formed at one end of the support arm and extending through said opening; a mirror attached to the other end of the support arm; a generally V-shaped transverse notch formed in said ball, the spherical surfaces on either side of said notch respectively being releasably seated between said seat and said socket, the arrangement being such that said ball is normally frictionally held against movement but upon predetermined movement of said support arm said socket loses contact with said ball at said notch, thereby permitting physical separation of said mirror from said mounting bracket.

4. In combination with a motor vehicle having a front windshield, an interior mirror assembly located adjacent said windshield and providing a view rearwardly of the vehicle, said mirror assembly comprising: a support member having a mirror element connected at one end and a ball member formed at the other end; a mounting member attached to the vehicle above said windshield and having a spherical socket portion formed therein in which said ball member is received and about which the latter is relatively movable; clamping means movably connected to the mounting member and normally engaging a portion of the outer surface of said ball member for retaining the latter against said spherical socket portion; a notch formed in said ball member adjacent said portion of the outer surface thereof that causes said ball member to lose contact with said clamping means and thereby drop from the mounting member in response to a predetermined amount of movement of the support member towards said windshield.